United States Patent
Bell

(10) Patent No.: US 7,550,411 B2
(45) Date of Patent: Jun. 23, 2009

(54) SUBTERRANEAN TREATMENT FLUIDS COMPRISING POLYOXAZOLINE COMPOSITIONS AND METHODS OF USE IN SUBTERRANEAN FORMATIONS

(75) Inventor: Stephen A. Bell, Houston, TX (US)

(73) Assignee: Halliburton Energy Services, Inc., Duncan, OK (US)

( * ) Notice: Subject to any disclaimer, the term of this patent is extended or adjusted under 35 U.S.C. 154(b) by 197 days.

(21) Appl. No.: 11/652,311

(22) Filed: Jan. 10, 2007

(65) Prior Publication Data

US 2007/0111895 A1 May 17, 2007

Related U.S. Application Data

(62) Division of application No. 10/916,281, filed on Aug. 11, 2004, now Pat. No. 7,178,610.

(51) Int. Cl.
*C09K 8/22* (2006.01)
*C09K 8/24* (2006.01)
*E21B 21/00* (2006.01)

(52) U.S. Cl. .................. 507/117; 175/65; 507/103; 507/113

(58) Field of Classification Search .............. 507/113, 507/103, 117; 175/65
See application file for complete search history.

(56) References Cited

U.S. PATENT DOCUMENTS

| | | | | |
|---|---|---|---|---|
| 4,501,672 A * | 2/1985 | Connell et al. | ............... | 507/107 |
| 4,728,696 A | 3/1988 | Van Phung et al. | .......... | 526/304 |
| 4,828,724 A | 5/1989 | Davidson | ................. | 252/8.511 |
| 4,830,765 A | 5/1989 | Perricone et al. | ........... | 252/8.51 |
| 4,941,981 A | 7/1990 | Perricone et al. | ........... | 252/8.51 |
| 4,963,273 A | 10/1990 | Perricone et al. | ........... | 252/8.51 |
| 4,988,450 A | 1/1991 | Wingrave et al. | ........ | 252/8.514 |
| 5,134,118 A | 7/1992 | Patel et al. | ................... | 507/121 |
| 5,208,216 A | 5/1993 | Williamson et al. | ......... | 507/120 |
| 5,350,740 A | 9/1994 | Patel et al. | .................. | 507/129 |
| 5,403,820 A | 4/1995 | Walker | ...................... | 507/110 |
| 5,424,284 A | 6/1995 | Patel et al. | .................. | 507/129 |
| 5,635,458 A | 6/1997 | Lee et al. | ..................... | 507/240 |
| 5,684,075 A | 11/1997 | Patel et al. | .................. | 524/386 |
| 5,693,698 A | 12/1997 | Patel et al. | .................. | 524/386 |
| 5,908,814 A | 6/1999 | Patel et al. | .................. | 507/131 |
| 5,990,050 A | 11/1999 | Patel | ......................... | 507/136 |
| 6,093,862 A | 7/2000 | Sinquin et al. | ................ | 585/15 |
| 6,167,967 B1 | 1/2001 | Sweatman | | |
| 6,194,355 B1 * | 2/2001 | Jarrett et al. | ................ | 507/140 |
| 6,247,543 B1 | 6/2001 | Patel et al. | .................... | 175/64 |
| 6,291,405 B1 | 9/2001 | Lee et al. | .................... | 507/136 |
| 6,355,600 B1 | 3/2002 | Norfleet et al. | ............. | 507/120 |
| 6,422,325 B1 | 7/2002 | Krieger | ....................... | 175/50 |
| 6,423,173 B1 * | 7/2002 | Wexler | ....................... | 156/277 |
| 6,484,821 B1 | 11/2002 | Patel et al. | .................... | 175/64 |
| 6,544,933 B1 | 4/2003 | Reid et al. | .................. | 507/136 |
| 6,691,805 B2 | 2/2004 | Thaemlitz | .................... | 175/65 |
| 6,703,351 B2 | 3/2004 | Stowe, II | .................... | 507/117 |
| 7,178,610 B2 | 2/2006 | Bell | | |

FOREIGN PATENT DOCUMENTS

| EP | 0 229 912 A2 | 7/1987 |
|---|---|---|
| EP | 1 116 599 A2 | 7/2001 |

OTHER PUBLICATIONS

*Aquazol Poly (2-ethyl-2-oxazoline)*; Polymer Chemistry Innovations Incorporation, CAS No. 25805-17-8, dated 2003-2004.
Foreign communication from a related counterpart application dated Sep. 30, 2005.
Office action from U.S. Appl. No. 10/916,281 dated Mar. 14, 2006.
Office action from U.S. Appl. No. 10/916,281 dated Jul. 11, 2006.
Office action from U.S. Appl. No. 10/916,281 dated Oct. 31, 2005.
Office action from U.S. Appl. No. 10/916,281 dated Aug. 15, 2006.
Office action from U.S. Appl. No. 10/916,281 dated Sep. 14, 2006.

* cited by examiner

*Primary Examiner*—Timothy J. Kugel
(74) *Attorney, Agent, or Firm*—Craig W. Roddy; Baker Botts, LLP

(57) ABSTRACT

Methods of controlling shale swelling in a subterranean formation comprising introducing a treatment fluid into the subterranean formation, wherein the treatment fluid comprises a base fluid and a polyoxazoline composition. Subterranean treatment fluids comprising a base fluid and a polyoxazoline composition. Other methods and compositions are also provided.

19 Claims, No Drawings

SUBTERRANEAN TREATMENT FLUIDS COMPRISING POLYOXAZOLINE COMPOSITIONS AND METHODS OF USE IN SUBTERRANEAN FORMATIONS

This application is a divisional application of U.S. application Ser. No. 10/916,281 entitled "Subterranean Treatment Fluids Comprising Polyoxazoline Compositions and Methods of Use In Subterranean Formations," filed on Aug. 11, 2004, now U.S. Pat. No. 7,178,610, the entire disclosure of which is incorporated herein by reference.

BACKGROUND

The present invention relates to subterranean treatment fluids. In particular, the present invention relates to subterranean treatment fluid compositions that comprise polyoxazoline compositions and methods for using such compositions in subterranean applications.

A subterranean treatment fluid may be used in a subterranean formation in a variety of ways. For example, a treatment fluid may be used to drill a borehole in a subterranean formation, to stimulate a well bore in a subterranean formation, or to clean up a well bore in a subterranean formation, as well as for numerous other purposes. As used herein, "treatment fluid" refers to any fluid that may be used in a subterranean application in conjunction with a desired function and/or for a desired purpose. The term "treatment fluid" does not imply any particular action by the fluid.

A drilling fluid (one type of treatment fluid) often used in connection with drilling a well bore in a subterranean formation can be any number of fluids (gaseous or liquid) and mixtures of fluids and solids (such as solid suspensions, mixtures and emulsions of liquids, gases and solids) used in operations to drill well bores into subterranean formations. Drilling fluids are used, inter alia, to cool the drill bit, lubricate the rotating drill pipe to prevent it from sticking to the walls of the well bore, prevent blowouts by serving as a hydrostatic head to counteract the sudden entrance into the well bore of high pressure formation fluids, and remove drill cuttings from the well bore.

During drilling of subterranean well bores, it is common to encounter portions of the subterranean formation that contain materials that may react undesirably with water, e.g., shales or clays. For convenience, as referred to herein, the term "shale" shall be understood to include any subterranean materials that may "swell," or increase in volume, when exposed to water, whether commonly referred to as shale, clay, or other some subterranean material. Shales may be problematic during drilling operations, inter alia, because of their tendency to become chemically and/or physically altered when exposed to aqueous media such as aqueous-based drilling fluids. This alteration, of which swelling is one example, can result in undesirable drilling conditions and undesirable interference with the drilling fluid. For instance, the degradation of the shale may interfere with attempts to maintain the integrity of drilled cuttings traveling up the well bore until such time as the cuttings can be removed by solids control equipment located at the surface. Degradation, or erosion, of drilled cuttings prior to their removal at the surface can prolong drilling time, because shale particles traveling up the well bore may break into smaller and smaller particles, which increasingly exposes more of the shale's surface area to the drilling fluid, which leads to still further absorption of water, and further degradation.

Shale disintegration may also adversely impact "equivalent circulation density" (ECD). ECD is affected by the solids content of the drilling fluid, which usually increases if surface solids control equipment cannot remove shale from the drilling fluid. Plastic viscosity (an indicator of size and quantity of solids) is an important parameter in determining drilling rate. Maintenance of appropriate ECD is important, for example, in situations where a subterranean well bore is being drilled wherein a narrow tolerance exists between the weight of the drilling fluid needed to control the formation pressure, and the weight of the drilling fluid that will fracture the formation. In such circumstances, minimizing shale degradation provides improved control of the density of the drilling fluid, and enhances the probability of successfully drilling a well bore.

Shale degradation may substantially decrease the stability of the well bore, which may cause irregularities in the diameter of the well bore, e.g., the diameter of some portions of the well bore may be either smaller or greater than desired. In an extreme case, shale degradation may decrease the stability of the well bore to such an extent that the well bore will collapse, possibly in effect, inter alia, causing damage to the surrounding formation. Degradation of the shale may also, inter alia, interrupt circulation of the drilling fluid, cause greater friction between the drill string and the well bore, or cause the drill string to become stuck in the well bore. These and other complications that may be associated with shale swelling may greatly increase costs associated with subterranean operations.

A traditional method of inhibiting shale swelling during drilling to attempt to minimize such complications has been to use an oil-based drilling fluid as opposed to an aqueous-based drilling fluid. However, oil-based drilling fluids are often environmentally undesirable because they may be toxic to marine plants and animals. Accordingly, environmental regulations enacted by numerous countries have curtailed the use of oil-based drilling fluids. Consequently, water-based drilling fluids are preferred because they may have a more benign effect on the environment than oil-based drilling fluids.

Another means to counteract the propensity of aqueous drilling fluids to interact with reactive shales in the formation is to add a shale-inhibiting component to the aqueous drilling fluid. As referred to herein, the term "shale-inhibiting component" will be understood to mean a compound that demonstrates a propensity for inhibiting the tendency of a sample of shale to absorb water, often by adhering to the shale's surface and/or insertion between clay platelets. Commonly used shale-inhibiting components are polyacrylamides. Polyacrylamide shale-inhibiting components, however, are becoming more environmentally undesirable, especially in heavily regulated areas, because they generally demonstrate low biodegradability and high toxicity. Moreover, polyacrylamide shale-inhibiting components contain a toxic residual monomer (e.g., an unreacted monomer) that is undesirable. Additionally, the degradation products of polyacrylamide shale-inhibiting components are not useful; consequently, usually more must be added to keep the desired concentration at a level to achieve a desired effect (which means more of the undesirable residual monomer is added to the system). Potassium chloride is another material that has been utilized as a shale inhibitor, but it is considered to be only moderately effective at inhibiting the swelling of shale. Furthermore, potassium chloride is environmentally unacceptable in some areas of the world, e.g., the North Sea and the Gulf of Mexico. Potassium chloride also is disfavored in the Middle East, where wells may be drilled in close proximity to aquifers. Polyglycols also have been used as shale inhibitors in water-based drilling fluids but have not reached satisfactory inhibition levels. Partially hydrolyzed polyacrylamides also have been utilized in many regions, but these have been found to cause formation damage and generally are regarded as environmentally undesirable

SUMMARY

The present invention relates to subterranean treatment fluids. In particular, the present invention relates to subterranean treatment fluid compositions that comprise polyoxazoline compositions and methods for using such compositions in subterranean applications.

In one embodiment, the present invention provides a method of controlling shale swelling in a subterranean formation comprising introducing a treatment fluid into the subterranean formation, wherein the treatment fluid comprises a base fluid and a polyoxazoline composition.

In another embodiment, the present invention provides a method of treating a portion of a subterranean formation comprising the steps of: introducing a treatment fluid that comprises a base fluid and a polyoxazoline composition; and treating a portion of the subterranean formation.

In another embodiment, the present invention provides a method of drilling a portion of a well bore in a subterranean formation comprising the steps of: providing a drilling fluid that comprises a base fluid and a polyoxazoline composition; and drilling at least a portion of the well bore in the subterranean formation.

In another embodiment, the present invention provides a method of avoiding the loss of circulation of a treatment fluid in a subterranean formation, comprising the step of adding to the treatment fluid a polyoxazoline composition and introducing the treatment fluid into a portion of the subterranean formation.

In another embodiment, the present invention provides a subterranean treatment fluid comprising a base fluid and a polyoxazoline composition.

In another embodiment, the present invention provides a subterranean fluid loss control agent for use in subterranean applications comprising a polyoxazoline composition.

In another embodiment, the present invention provides a shale-inhibiting component for use in a subterranean application comprising a polyoxazoline composition.

The features and advantages of the present invention will be readily apparent to those skilled in the art upon a reading of the description of exemplary embodiments, which follows.

DESCRIPTION OF PREFERRED EMBODIMENTS

The present invention relates to subterranean treatment fluids. In particular, the present invention relates to subterranean treatment fluid compositions that comprise polyoxazoline compositions and methods for using such compositions in subterranean applications. While the compositions and methods of the present invention are useful in a variety of subterranean applications, they may be particularly useful in hydrocarbon and water well drilling applications. Although described in an onshore environment, the benefits of the present invention also may be appreciated in offshore wells.

The subterranean treatment fluids may be used in a variety of subterranean applications, such as drilling, stimulation, and completion operations, wherein it may be desirable to control shale swelling and/or provide fluid loss control. In certain preferred embodiments, the fluids of the present invention are used in drilling operations. In certain embodiments, the subterranean treatment fluids of the present invention may vary in density in the range of from about 4 lb/gallon to about 22 lb/gallon when measured at sea level. When utilized in offshore applications, the treatment fluids may have a density in the range of from about 6 lb/gallon to about 20 lb/gallon.

The subterranean treatment fluids of the present invention comprise a base fluid and a polyoxazoline composition. Other additives suitable for use in subterranean operations also may be added to these compositions if desired.

The base fluids utilized in the subterranean treatment fluids of the present invention may be aqueous-based or nonaqueous-based, or mixtures thereof. Where the base fluid is aqueous-based, the water utilized can be fresh water, saltwater (e.g., water containing one or more salts dissolved therein), brine (e.g., saturated saltwater), or seawater. Generally, the water can be from any source, provided that it does not contain an excess of compounds that may adversely affect other components in the treatment fluid. Potentially problematic compounds to be mindful of will be evident to one skilled in the art with the benefit of this disclosure. Generally, the base fluid is present in an amount sufficient to form a pumpable subterranean treatment fluid. More particularly, in certain embodiments, the base fluid is typically present in a treatment fluid of the present invention in an amount in the range of from about 20% to about 99.99% by volume of the treatment fluid.

Where the base fluid is nonaqueous-based, the base fluid may comprise any number of organic fluids. Examples of suitable organic fluids include, but are not limited to, mineral oils, synthetic oils, esters, and the like. Generally, these organic fluids generically are referred to herein as "oils." Any oil in which a water solution of salts can be emulsified may be suitable for use as a base fluid in the treatment fluids of the present invention.

The polyoxazoline compositions of the present invention may comprise a polyoxazoline, a polyoxazoline derivative, a chemically altered polyoxazoline, a polyoxazoline copolymer, or a combination thereof (sometimes referred to herein collectively as "polyoxazolines"). A polyoxazoline is made by the polymerization of an oxazoline monomer, which is described by the following formula in Formula 1:

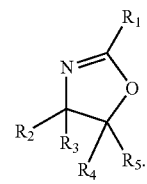

Formula 1 wherein $R_1$, $R_2$, $R_3$, $R_4$, and $R_5$ may be the same or different groups, and $R_1$, $R_2$, $R_3$, $R_4$, and $R_5$ may comprise hydrogens or a hydrocarbon group having from about 1 to about 30 carbon atoms that, for example, may comprise a linear or branched alkyl, alkenyl, aryl, alkylaryl, arylalkyl, cycloalkyl, alkyl ether, aryl ether, alkyl aryl ether, amines, esters, carboxylic acids, or amides, or a mixture thereof. $R_1$, $R_2$, $R_3$, $R_4$, and $R_5$ may comprise a heteroatom. In choosing a suitable $R_1$, $R_2$, $R_3$, $R_4$, and $R_5$, one should be mindful of potential resonance effects with the cyclic amine group and the Lewis basic nature, as problems with the polymerization catalysts may result. A polyoxazoline derivative, as that term is used herein, is a polymer made from a monomer according to Formula 1, but where at least one of $R_1$, $R_2$, $R_3$, $R_4$, and $R_5$ is not a hydrogen. For instance, in one embodiment of a polyoxazoline derivative, $R_1$ may be an ethyl group and $R_2$, $R_3$, $R_4$, and $R_5$ may be hydrogens. In another embodiment, $R_1$ may be an alkoxy group and one of $R_2$, $R_3$, $R_4$, and $R_5$ may be an ester group while the others are hydrogens or any other hydrocarbon group. A chemically altered polyoxazoline, as that term is used herein, refers to where a homopolymer has been made from a monomer described by Formula 1 and then chemically altered so as to have a desired functionality, e.g., by introducing amine groups, carboxylate groups, or other functional groups into the polymer chain. A polyoxazoline copolymer, as that term is used herein, refers to any type of copolymer (including terpolymers, block copolymers, random copolymers, statistical copolymers, and the like) that comprises a polyoxazoline, a polyoxazoline derivative, a chemically altered polyoxazoline, and at least a second polymer or monomer, which may or may not be a polyoxazoline or a polyoxazoline derivative. For example, one type of polyoxazoline copolymer comprises a polyoxazoline derivative (e.g., polyethyloxazoline) and polyethylene, polypropylene, and/or a polyacrylamide. An example of suitable commercially available polyoxazoline derivative includes poly(2-ethyl-2-oxazoline), known as "AQUAZOL," from Polymer Chemistry Innovations, in Tucson, Ariz. Suitable polyoxazolines preferably may have a molecular weight of from about 2,000 to about 50,000; however, in other embodiments, the molecular weight may be from about 100,000 to about 700,000. Other molecular weights may be suitable, depending on the end use, as will be recognized by one skilled in the art with the benefit of this disclosure.

As a general matter, polyoxazolines are thermally stable up to temperatures of about 380° C., which may make them useful in, for example, well bores having relatively higher bottom hole temperatures (BHT). Also, when polyoxazolines degrade, they form degradation products (e.g., polyethylene imines) that may be useful in the subterranean environment, for example, for fluid loss control. See U.S. Pat. No. 5,340,860 (assigned to Halliburton Energy Services) regarding the use of a fluid loss-reducing additive comprising a polyethylene imine in, e.g., cement compositions, the relevant disclosure of which is incorporated by reference.

The subterranean treatment fluids of the present invention optionally may comprise weighting agents. Such weighting agents are typically heavy minerals, such as barite, hematite, ilmenite, calcium carbonate, iron carbonate, or the like. Where used, these weighting agents may increase the density of a treatment fluid of the present invention sufficiently, inter alia, to offset high pressures which may be encountered during certain phases of the drilling operation. Where used, the weighting agents are generally present in a treatment fluid of the present invention in an amount in the range of from about 0% to about 40% by volume of the base fluid.

The treatment fluids of the present invention also optionally may comprise salts. Examples of suitable salts include soluble salts of Group IA and Group IIA alkali and alkaline earth metal halides, as well as acetates, formates, nitrates, sulfates, and the like. As used herein, the terms "Group IA" and "Group IIA" will be understood to mean those elements depicted as belonging to either Group IA or Group IIA, respectively, as shown on the periodic table of the elements found in the endpapers of John McMurry, *Organic Chemistry* (4th. ed. 2003). In certain preferred embodiments, wherein the treatment fluids of the present invention comprise an aqueous-based fluid, salts such as sodium chloride, sodium bromide, potassium chloride, sodium formate, and potassium formate may be preferred. In certain other preferred embodiments, wherein the treatment fluids of the present invention comprise a nonaqueous-based fluid, calcium chloride, potassium chloride, sodium chloride, and sodium nitrate are preferred. One of ordinary skill in the art, with the benefit of this disclosure, will recognize the appropriate salt for a particular application.

Additional additives may be added to the treatment fluids of the present invention as deemed appropriate by one skilled in the art. Where the treatment fluid comprises an aqueous base fluid, the treatment fluid may further comprise additives such as conventional shale inhibitors, viscosifiers, filtration control agents, pH control agents, and the like. Examples of suitable shale swelling inhibitors include, but are not limited to, amines, polyglycols, quaternary amine salts, and the like. Polyacrylamides, such as partially hydrolyzed polyacrylamides, also may be used as long as one is mindful of the regulations that may apply to the application and the particular problems the polyacrylamides may present. An example of a suitable partially hydrolyzed polyacrylamide is commercially available under the trade name "EZMUD®," from Halliburton Energy Services, Inc., of Houston, Tex. An example of a suitable polyglycol is commercially available under the trade name "GEM®," from Halliburton Energy Services, Inc., of Houston, Tex. Examples of suitable viscosifiers include clays, high molecular weight biopolymer polysaccharides, celluloses, and the like. Examples of suitable clays are a sodium montmorillonite clay commercially available from Halliburton Energy Services, Inc., of Houston, Tex., under the trade name "AQUAGEL®"; and an attapulgite clay commercially available from Halliburton Energy Services, Inc., of Houston, Tex., under the trade name "ZEOGEL®." An example of a suitable high molecular weight biopolymer polysaccharide is commercially available under the trade name "BARAZAN®" from Halliburton Energy Services, Inc., of Houston, Tex. An example of a suitable hydroxyethylcellulose is commercially available from Halliburton Energy Services, Inc., of Houston, Tex., under the trade name "LIQUI-VIS®." In certain preferred embodiments of the treatment fluids of the present invention, BARAZAN® is used as the viscosifier when the treatment fluid comprises an aqueous-based fluid. Examples of suitable filtration control agents include starches, modified starches, carboxymethylcellulose, polyanionic cellulose, polyacrylates, and the like. An example of a suitable starch is commercially available from Halliburton Energy Services, Inc., of Houston, Tex., under the trade name "IMPERMEX.". An example of a suitable modified starch is commercially available from Halliburton Energy Services, Inc., of Houston, Tex., under the trade name "FILTER-CHEK®." An example of a suitable carboxymethylcellulose is commercially available from Halliburton Energy Services, Inc., of Houston, Tex., under the trade name "CELLEX." An example of a suitable polyanionic cellulose is commercially available from Halliburton Energy Services, Inc., of Houston, Tex., under the trade name "PAC." An example of a suitable polyacrylate is commercially available from Halliburton Energy Services, Inc., of Houston, Tex., under the trade name "POLYAC®." In certain preferred embodiments of the treatment fluids of the present invention, FILTER-CHEK® or PAC is used as the filtration control agent when the treatment fluid comprises an aqueous-based fluid. Examples of suitable pH control agents include sodium hydroxide, potassium hydroxide, calcium hydroxide, magnesium oxide, and the like. An example of a suitable source of magnesium oxide is commercially available from Halliburton Energy Services, Inc., of Houston, Tex., under the trade name "BARABUF®." In certain preferred embodiments of the treatment fluids of the present invention, sodium hydroxide or potassium hydroxide is used as the pH control agent when the treatment fluid comprises an aqueous-based fluid.

Where the treatment fluids of the present invention comprise a nonaqueous-based fluid, the treatment fluids may further comprise additives such as emulsifiers, viscosifiers, filtration control agents, pH control agents, and the like. Examples of suitable emulsifiers include polyaminated fatty acids, concentrated tall oil derivatives, blends of oxidized tall oil and polyaminated fatty acids, and the like. Examples of suitable commercially available polyaminated fatty acids are commercially available from Halliburton Energy Services, Inc., of Houston, Tex., under the trade names "EZMUL" and "SUPERMUL." An example of a suitable commercially available concentrated tall oil derivative is commercially available from Halliburton Energy Services, Inc., of Houston, Tex., under the trade name "FACTANT." Examples of suitable commercially available blends of oxidized tall oil and polyaminated fatty acids are commercially available from Halliburton Energy Services, Inc., of Houston, Tex., under the trade names "INVERMUL®" and "LE MUL." Examples of suitable viscosifiers include clays, modified fatty acids, and the like. An example of a suitable clay is an organophilic clay commercially available from Halliburton Energy Services, Inc., of Houston, Tex., under the trade name "GELTONE." Examples of suitable modified fatty acids are commercially available from Halliburton Energy Services, Inc., of Houston, Tex., under the trade names "RHEMOD-L" and "TEMPERUS." Examples of suitable filtration control agents include lignites, modified lignites, powdered resins, and the like. An example of a suitable commercially available lignite is commercially available from Halliburton Energy Services, Inc., of Houston, Tex., under the trade name "CARBONOX." An example of a suitable commercially available modified lignite is commercially available from Halliburton Energy Services, Inc., of Houston, Tex., under the trade name "BARANEX." An example of a suitable commercially available powdered resin is commercially available from Halliburton Energy Services, Inc., of Houston, Tex., under the trade name "BARABLOK." Examples of suitable pH control agents include, but are not limited to, calcium hydroxide, potassium hydroxide, sodium hydroxide, and the like. In certain exemplary embodiments wherein the treatment fluids of the present invention comprise a nonaqueous-based fluid, calcium hydroxide is a preferred pH control agent.

While a number of preferred embodiments described herein relate to drilling fluids and compositions, it is understood that any well treatment fluid, such as drilling, completion, and stimulation fluids, including, but not limited to, drilling muds, well cleanup fluids, workover fluids, spacer fluids, gravel pack fluids, acidizing fluids, fracturing fluids, and the like, may benefit from the addition of a polyoxazoline composition of the present invention. Furthermore, the treatment fluids of the present invention may be used in drilling wells in formations comprising thief zones. As referred to herein, the term "thief zones" will be understood to mean segments of a subterranean formation which are sufficiently fractured (before or during drilling) as to potentially cause the loss of circulation of fluids out of the well bore into such fractures. Where the treatment fluids of the present invention are used in formations comprising thief zones, a portion of the treatment fluid may flow into such thief zones to prevent further loss of circulation, e.g., through the degradation products of the polyoxazoline compositions.

In one embodiment, the present invention provides a method of controlling shale swelling in a subterranean formation comprising introducing a treatment fluid into the subterranean formation, wherein the treatment fluid comprises a base fluid and a polyoxazoline composition.

In another embodiment, the present invention provides a method of treating a portion of a subterranean formation comprising the steps of: introducing a treatment fluid that comprises a base fluid and a polyoxazoline composition; and treating a portion of the subterranean formation.

In another embodiment, the present invention provides a method of drilling a portion of a well bore in a subterranean formation comprising the steps of: providing a drilling fluid that comprises a base fluid and a polyoxazoline composition; and drilling at least a portion of the well bore in the subterranean formation.

In another embodiment, the present invention provides a method of avoiding the loss of circulation of a treatment fluid in a subterranean formation, comprising the step of adding to the treatment fluid a polyoxazoline composition and introducing the treatment fluid into a portion of the subterranean formation.

In another embodiment, the present invention provides a subterranean treatment fluid comprising a base fluid and a polyoxazoline composition.

In another embodiment, the present invention provides a subterranean fluid loss control agent for use in subterranean applications comprising a polyoxazoline composition.

In another embodiment, the present invention provides a shale-inhibiting component for use in a subterranean application comprising a polyoxazoline composition.

To facilitate a better understanding of the present invention, the following examples of some of the preferred embodiments is given. In no way should such example be read to limit, or define, the scope of the invention.

EXAMPLE

Polyethyloxazoline was studied as an example of the methods and compositions of the present invention. Low molecular weight polyethyloxazoline and high molecular weight polyethyloxazoline samples were obtained from Polymer Chemistry Innovations, in Tucson, Ariz. The low molecular weight sample had a molecular weight of about 50,000; the high molecular weight sample had a molecular weight of about 500,000. Standard solutions of each were made by adding the polymer to water, and these were used to produce water-based fluids. Studies were undertaken to compare the rheology (on a Fann 35A rheometer), cuttings erosion (a weight test was used), and filtration control (a low-pressure API filter press was used) of the polyethyloxazoline loadings and treatment fluids containing polyethyloxazoline relative to treatment fluids containing polyacrylates. A Sanin area clay and a London area clay were used. Tables 1 and 3 contain the sample formulations. Fluid properties are contained in Tables 2 and 4.

TABLE 1

| | Sample Formulations | | | | |
|---|---|---|---|---|---|
| Components | Sample 1 | Sample 2 | Sample 3 | Sample 4 | Sample 5 |
| Water, (bbl) | 0.831 | 0.831 | 0.831 | 0.831 | 0.831 |
| NaCl, (ppb) | 90.7 | 90.7 | 90.7 | 90.7 | 90.7 |
| Xanthan Viscosifier, (ppb) | 1 | 1 | 1 | 1 | 1 |
| Shale Stabilizer, (ppb) | 4 | 4 | 4 | 4 | 4 |

TABLE 1-continued

Sample Formulations

| Components | Sample 1 | Sample 2 | Sample 3 | Sample 4 | Sample 5 |
|---|---|---|---|---|---|
| Filtration Control Agent, (ppb) | 2 | 2 | 2 | 2 | 2 |
| Low Molecular Weight Polyethyloxazoline, (ppb) | 2 | 2 | 4 | 4 | 6 |
| High Molecular Weight Polyethyloxazoline500, (ppb) | 0.5 | 1.5 | 0.5 | 1.5 | 3 |
| Barite, (ppb) | 95.7 | 95.7 | 95.7 | 95.7 | 95.7 |

TABLE 2

Fluid Properties

| Fluid Properties | Sample 1 | Sample 2 | Sample 3 | Sample 4 | Sample 5 |
|---|---|---|---|---|---|
| Aging Temperature, (° F.) | 150 | 150 | 150 | 150 | 150 |
| Aging Conditions | rolling | rolling | rolling | rolling | rolling |
| Aging Period, (hr) | 16 | 16 | 16 | 16 | 16 |
| 600 rpm | 30 | 31 | 30 | 33 | 37 |
| 300 rpm | 20 | 22 | 22 | 23 | 26 |
| 200 rpm | 17 | 18 | 18 | 19 | 21 |
| 100 rpm | 12 | 13 | 13 | 13 | 16 |
| 6 rpm | 4 | 4 | 4 | 4 | 5 |
| 3 rpm | 3 | 3 | 3 | 3 | 3 |
| PV, (cP) | 10 | 9 | 8 | 10 | 11 |
| YP, (lb/100 ft$^2$) | 10 | 13 | 14 | 13 | 15 |
| 10 sec. gel, (lb/100 ft$^2$) | 4 | 4 | 5 | 4 | 4 |
| 10 min. gel, (lb/100 ft$^2$) | 4 | 4 | 4 | 4 | 6 |
| Sanin Clay Added, (ppb) | 30.1 | 30.2 | 29.4 | 30.1 | 30.2 |
| Sanin Clay Recovered Dry, (ppb) | 8.2 | 9.0 | 5.9 | 9.7 | 19.6 |
| Sanin Clay Hydrated Weight (11%) | 9.1 | 10.0 | 6.5 | 10.8 | 21.8 |
| Amount Recovered, (%) | 30 | 33 | 22 | 36 | 72 |

TABLE 3

| Fluid Formulations | Sample 1 | Sample 2 | Sample 3 | Sample 4 |
|---|---|---|---|---|
| Water, (bbl) | 0.831 | 0.831 | 0.831 | 0.831 |
| NaCl, (ppb) | 90.7 | 90.7 | 90.7 | 90.7 |
| Xanthan Viscosifier, (ppb) | 1 | 1 | 1 | 1 |
| Shale Stabilizer, (ppb) | 4 | 4 | 4 | 4 |
| Filtration Control Agent, (ppb) | 2 | 2 | 2 | 2 |
| Polyacrylamide Shale-inhibiting Component A, (ppb) | 0 | 4 | 0 | 8 |
| Polyacrylamide Shale-inhibiting Component B, (ppb) | 0 | 1.5 | 0 | 2 |
| Low Molecular Weight Polyethyloxazoline, (ppb) | 4 | 0 | 8 | 0 |
| High Molecular Weight Polyethyloxazoline, (ppb) | 1.5 | 0 | 2 | 0 |
| Barite, (ppb) | 95.7 | 95.7 | 95.7 | 95.7 |
| KOH to pH | 8.75 | 8.75 | 8.75 | 8.75 |

TABLE 4

| Fluid Properties | Sample 1 | Sample 2 | Sample 3 | Sample 4 |
|---|---|---|---|---|
| Aging Temperature, (° F.) | 150 | 150 | 150 | 150 |
| Aging Conditions | rolling | rolling | rolling | rolling |
| Aging Period, (hr) | 16 | 16 | 16 | 16 |
| 600 rpm | 37 | 51 | 37 | 71 |
| 300 rpm | 27 | 34 | 25 | 46 |
| 200 rpm | 21 | 26 | 20 | 36 |
| 100 rpm | 16 | 17 | 15 | 23 |
| 6 rpm | 5 | 4 | 4 | 7 |
| 3 rpm | 4 | 3 | 3 | 5 |
| PV, (cP) | 10 | 17 | 12 | 25 |
| YP, (lb/100 ft$^2$) | 17 | 17 | 13 | 21 |
| 10 sec. gel, (lb/100 ft$^2$) | 5 | 4 | 4 | 6 |
| 10 min. gel, (lb/100 ft$^2$) | 6 | 5 | 5 | 7 |
| API Filtrate, (30 min. at 70° F.) | 9 | 8 | 7 | 7 |
| London Clay Added, (ppb) | 30.0 | 30.0 | 30.1 | 30.0 |
| London Clay Recovered Dry, (ppb) | 25.5 | 25.4 | 25.2 | 26.4 |
| London Clay Hydrated Weight (14%) | 29.8 | 29.8 | 29.5 | 30.8 |
| Amount Recovered, (%) | 99 | 99 | 98 | 103 |

These experiments indicate that polyoxazolines are effective shale-inhibiting and cuttings erosion components, and do not cause significant increases in rheological measurements of the treatment fluids they are used in at the loadings outlined herein.

Therefore, the present invention is well adapted to carry out the objects and attain the ends and advantages mentioned as well as those which are inherent therein. While the invention has been depicted and described by reference to exemplary embodiments of the invention, such a reference does not imply a limitation on the invention, and no such limitation is to be inferred. The invention is capable of considerable modification, alternation, and equivalents in form and function, as will occur to those ordinarily skilled in the pertinent arts and having the benefit of this disclosure. The depicted and described embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A drilling fluid for use in drilling a well in a subterranean formation comprising an aqueous fluid, a polyoxazoline composition and at least one selected from the following group: a weighting agent, a salt, a shale-inhibiting component, a viscosifier, a filtration control agent, a pH control agent, an emulsifier, a bridging agent, and a combination thereof.

2. The drilling fluid of claim 1 wherein the drilling fluid has a density of about 4 lb/gallon to about 22 lb/gallon when measured at sea level.

3. The drilling fluid of claim 1 wherein the aqueous fluid comprises at least one selected from the following group: fresh water, saltwater, a brine, seawater, and a combination thereof.

4. The drilling fluid of claim 1 wherein the aqueous fluid is present in an amount sufficient to make the drilling fluid pumpable into the subterranean formation.

5. The drilling fluid of claim 1 wherein the aqueous fluid is present in an amount of from about 20% to about 99.99% by the volume of the drilling fluid.

6. The drilling fluid of claim 1 wherein the polyoxazoline composition comprises at least one selected from the following group: a polyoxazoline, a polyoxazoline derivative, a chemically altered polyoxazoline, a polyoxazoline copolymer, and a combination thereof.

7. The drilling fluid of claim 1 wherein the polyoxazoline composition has a molecular weight between 2,000 and 50,000.

8. The drilling fluid of claim 1 wherein the polyoxazoline composition has a molecular weight of between 100,000 and 700,000.

9. A drilling fluid for use in drilling a well in a subterranean formation comprising an aqueous fluid, a viscosifier, a bridging agent, and a polyoxazoline composition.

10. The drilling fluid of claim 9 wherein the drilling fluid has a density of about 4 lb/gallon to about 22 lb/gallon when measured at sea level.

11. The drilling fluid of claim 9 wherein the aqueous fluid comprises at least one selected from the following group: fresh water, saltwater, a brine, seawater, and a combination thereof.

12. The drilling fluid of claim 9 wherein the aqueous fluid is present in an amount sufficient to make the drilling fluid pumpable into the subterranean formation.

13. The drilling fluid of claim 9 wherein the aqueous fluid is present in an amount of from about 20% to about 99.99% by the volume of the drilling fluid.

14. The drilling fluid of claim 9 wherein the polyoxazoline composition comprises at least one selected from the following group: a polyoxazoline, a polyoxazoline derivative, a chemically altered polyoxazoline, a polyoxazoline copolymer, and a combination thereof.

15. The drilling fluid of claim 9 wherein the polyoxazoline composition has a molecular weight between 2,000 and 50,000.

16. The drilling fluid of claim 9 wherein the polyoxazoline composition has a molecular weight of between 100,000 and 700,000.

17. The drilling fluid of claim 9 wherein the drilling fluid further comprises at least one selected from the following group: a weighting agent, a salt, a shale-inhibiting component, a filtration control agent, a pH control agent, an emulsifier, and a combination thereof.

18. A subterranean treatment fluid comprising a base fluid and a polyoxazoline composition having a density of about 4 lb/gallon to about 22 lb/gallon when measured at sea level.

19. The subterranean treatment fluid of claim 18 wherein the polyoxazoline composition comprises at least one selected from the following group: a polyoxazoline, a polyoxazoline derivative, a chemically altered polyoxazoline, a polyoxazoline copolymer, and a combination thereof.

* * * * *